United States Patent
Ishiguro et al.

(10) Patent No.: US 11,866,378 B2
(45) Date of Patent: Jan. 9, 2024

(54) METHOD FOR PRODUCING HONEYCOMB STRUCTURE

(71) Applicant: IBIDEN CO., LTD., Ogaki (JP)

(72) Inventors: Sonosuke Ishiguro, Gifu (JP); Yoshihiro Koga, Gifu (JP)

(73) Assignee: IBIDEN CO., LTD., Ogaki (JP)

( * ) Notice: Subject to any disclaimer, the term of this patent is extended or adjusted under 35 U.S.C. 154(b) by 720 days.

(21) Appl. No.: 16/979,172

(22) PCT Filed: Mar. 12, 2019

(86) PCT No.: PCT/JP2019/009861
§ 371 (c)(1),
(2) Date: Sep. 9, 2020

(87) PCT Pub. No.: WO2019/176897
PCT Pub. Date: Sep. 19, 2019

(65) Prior Publication Data
US 2020/0399185 A1   Dec. 24, 2020

(30) Foreign Application Priority Data

Mar. 13, 2018  (JP) .................................. 2018-045692

(51) Int. Cl.
*C04B 38/00* (2006.01)
*C04B 35/565* (2006.01)
(Continued)

(52) U.S. Cl.
CPC ........ *C04B 38/0006* (2013.01); *C04B 35/565* (2013.01); *C04B 38/0655* (2013.01);
(Continued)

(58) Field of Classification Search
CPC .............. C04B 38/0006; C04B 35/565; C04B 2235/3826; C04B 2235/616;
(Continued)

(56) References Cited

U.S. PATENT DOCUMENTS

2005/0244581 A1 * 11/2005 Thebault ............... C04B 37/006
264/156
2006/0169404 A1   8/2006 Thebault et al.
(Continued)

FOREIGN PATENT DOCUMENTS

JP     62-216981       9/1987
JP    62216981 A  *   9/1987
(Continued)

OTHER PUBLICATIONS

JP 2012-211071A (Kobayashi) Nov. 1, 2012 (English language machine translation). [online] [retrieved Jun. 23, 2023]. Retrieved from: Espacenet. (Year: 2012).*
(Continued)

*Primary Examiner* — Erin Snelting
(74) *Attorney, Agent, or Firm* — MORI & WARD, LLP (57) ABSTRACT

Disclosed is a method for manufacturing a honeycomb structure. The method includes molding a molded body from a mixture containing silicon carbide particles, an organic component, and a dispersion medium, removing the organic component included in the molded body to obtain a porous honeycomb body, and impregnating an inner portion of partition walls of the porous honeycomb body with metal silicon. In a state in which the porous honeycomb body is placed on a support inside a container containing solid metal silicon, the impregnating an inner portion of the partition walls is performed by heating the inside of the container to a temperature higher than or equal to a melting point of the metal silicon so that the porous honeycomb body is impregnated with molten metal silicon through the support that is porous.

6 Claims, 5 Drawing Sheets

(51) Int. Cl.
*C04B 38/06* (2006.01)
*C04B 41/45* (2006.01)
*C04B 35/64* (2006.01)
*C04B 35/638* (2006.01)
*C04B 41/87* (2006.01)
*C04B 41/00* (2006.01)
*C04B 35/622* (2006.01)
*C04B 20/10* (2006.01)
*B28B 3/20* (2006.01)
*C04B 35/63* (2006.01)

(52) U.S. Cl.
CPC .......... *C04B 41/4523* (2013.01); *C04B 41/87* (2013.01); *B28B 2003/203* (2013.01); *C04B 20/10* (2013.01); *C04B 20/1014* (2013.01); *C04B 35/622* (2013.01); *C04B 35/63* (2013.01); *C04B 35/638* (2013.01); *C04B 35/64* (2013.01); *C04B 41/0018* (2013.01); *C04B 41/0072* (2013.01); *C04B 2235/3826* (2013.01); *C04B 2235/616* (2013.01)

(58) Field of Classification Search
CPC ............ C04B 41/0018; C04B 41/4523; C04B 38/0016–0019
See application file for complete search history.

(56) References Cited

U.S. PATENT DOCUMENTS

| | | | | |
|---|---|---|---|---|
| 2009/0120743 | A1* | 5/2009 | Thebault | C04B 41/5059 188/218 XL |
| 2012/0172192 | A1* | 7/2012 | Husnay | C04B 35/65 501/87 |
| 2012/0264596 | A1* | 10/2012 | Koga | C04B 37/005 427/124 |
| 2014/0109756 | A1* | 4/2014 | Aghjanian | C04B 41/85 89/36.02 |
| 2014/0294689 | A1* | 10/2014 | Mase | C04B 38/0006 264/618 |
| 2014/0363577 | A1* | 12/2014 | Lazur | C04B 41/5133 427/314 |
| 2016/0159699 | A1* | 6/2016 | Lazur | C22C 1/1036 156/283 |
| 2020/0165169 | A1 | 5/2020 | Koga | |

FOREIGN PATENT DOCUMENTS

| | | | | |
|---|---|---|---|---|
| JP | 09-20572 | | 1/1997 | |
| JP | 09020572 | A * | 1/1997 | |
| JP | 2000143359 | A * | 5/2000 | ........... C04B 41/009 |
| JP | 3664421 | B2 * | 6/2005 | ........... C04B 41/009 |
| JP | 2005-320236 | | 11/2005 | |
| JP | 2006-517899 | | 8/2006 | |
| JP | 2012211071 | A * | 11/2012 | |
| JP | 2017-218342 | | 12/2017 | |
| WO | WO 2017/213089 | | 12/2017 | |

OTHER PUBLICATIONS

International Search Report for corresponding International Application No. PCT/JP2019/009861, dated Jun. 11, 2019.
Written Opinion for corresponding International Application No. PCT/JP2019/009861, dated Jun. 11, 2019.

* cited by examiner

METHOD FOR PRODUCING HONEYCOMB STRUCTURE

TECHNICAL FIELD

The present invention relates to a method for manufacturing a honeycomb structure.

BACKGROUND ART

Patent Document 1 discloses an example of a honeycomb structure used as a heat exchanger. The honeycomb structure is formed from silicon carbide and impregnated with metal silicon. The honeycomb structure of Patent Document 1 is manufactured by heating a molded body, which is molded from a mixture of ceramic particles, an organic binder, and a dispersion medium, to remove the organic binder and obtain a degreased body, and then impregnating an inner side of walls of the degreased body with metal silicon.

PRIOR ART LITERATURE

Patent Literature

Patent Document 1: Japanese Laid-Open Patent Publication No. 2017-218342

SUMMARY OF THE INVENTION

Problems that the Invention is to Solve

In Patent Document 1, the degreased body is impregnated with metal silicon by heating the degreased body in a state in which a mass of metal silicon is placed on the degreased body. In this case, molten metal silicon impregnates the inner side of the degreased body because of the weight of the molten metal silicon. Accordingly, the amount of metal silicon that impregnates the degreased body may exceed the pore volume of the degreased body, and the excess metal silicon may ooze down from the periphery of the honeycomb structure or enter the cells of the honeycomb structure. Thus, it is difficult to ensure consistent shape precision with the manufacturing method of Patent Document 1.

The present invention is made in view of such circumstances, and one object of the present invention is to provide a method for manufacturing a honeycomb structure that improves the consistency of shape precision.

Means for Solving the Problems

A method for manufacturing a honeycomb structure that solves the above problems manufactures a honeycomb structure that includes partition walls partitioning a plurality of cells. The method includes a molding step, a degreasing step, and an impregnation step. In the molding step, a molded body is molded from a mixture containing silicon carbide particles, an organic component, and a dispersion medium. In the degreasing step, the organic component included in the molded body is removed to obtain a porous honeycomb body. In the impregnation step, an inner portion of the partition walls of the porous honeycomb body is impregnated with metal silicon. In a state in which the porous honeycomb body is placed on a support inside a container containing solid metal silicon, the impregnation step is performed by heating the inside of the container to a temperature higher than or equal to a melting point of the metal silicon so that the porous honeycomb body is impregnated with molten metal silicon through the support that is porous.

With the above configuration, the porous honeycomb body is impregnated with metal silicon by the drawing force produced by capillary action of the porous honeycomb body. This avoids a situation in which the amount of the metal silicon that impregnates the porous honeycomb body exceeds the pore volume of the porous honeycomb body, and the excess metal silicon oozes down from the periphery of the honeycomb structure or enters the cells of the honeycomb structure and narrows the cells from their intended size. As a result, the honeycomb structure has more consistent shapes.

In the method for manufacturing a honeycomb structure of the present invention, it is preferred that the metal silicon be placed on a bottom surface of the container.

With the above configuration, molten metal silicon is drawn from the lower part of the container toward the upper part of the container by capillary action of the porous honeycomb body. This also avoids a situation in which excess metal silicon oozes down from the periphery of the porous honeycomb body or enters the cells of the honeycomb structure and narrows the cells from their intended size.

In the method for manufacturing a honeycomb structure of the present invention, it is preferred that the molded body be placed on the support inside the container. Further, it is preferred that the degreasing step be performed by setting a temperature inside the container to a first temperature that is a temperature at which the organic component is burned and removed and is lower than the melting point of the metal silicon, and then the impregnation step be performed by increasing the temperature to a second temperature that is higher than or equal to the melting point of the metal silicon.

With the above configuration, when the temperature inside the container is set to the first temperature, the organic component included in the molded body is burned and removed to obtain the porous honeycomb body. In this case, the first temperature is lower than the melting point of the metal silicon and thus the metal silicon in the container remains in a solid state. Then, when the temperature inside the container is increased to the second temperature that is higher than or equal to the melting point of the metal silicon, the metal silicon melts. The molten metal silicon impregnates the inner side of the porous honeycomb body through the support so that the honeycomb structure is obtained. In this manner, the degreasing step and the impregnation step can be performed continuously in a single heating process by managing the temperature inside the container. This simplifies the manufacturing process of the honeycomb structure.

In the method for manufacturing a honeycomb structure of the present invention, it is preferred that the first temperature be higher than or equal to 400° C. and lower than or equal to 1400° C.

With the above configuration, when performing the heating process at the first temperature, which corresponds to the degreasing step, the organic component is burned and removed in a preferred manner without melting the metal silicon and impregnating the molded body.

In the method for manufacturing a honeycomb structure of the present invention, it is preferred that the second temperature be higher than or equal to 1420° C. and lower than or equal to 2000° C.

With the above configuration, when performing the heating process at the second temperature, which corresponds to the impregnation step, the porous honeycomb body is impregnated with metal silicon in a preferred manner and wear caused by excess heating is avoided. Further, the honeycomb structure obtained by heating the porous honeycomb body to the second temperature is a non-sintered honeycomb structure in which most of silicon carbide particles are not sintered and exist independently from each other. The non-sintered honeycomb structure has a high Young's modulus, resists deformation, and is useful as, for example, a heat exchanger.

In the method for manufacturing a honeycomb structure of the present invention, the molded body placed inside the container may be an assembly of a plurality of molded bodies that has undergone the degreasing step.

Even with the assembly formed from the molded bodies, the molded body entirely having a degreased porous structure can be impregnated with metal silicon by the above-described mechanism.

The method for manufacturing a honeycomb structure of the present invention may include a firing step that performs heating at a temperature higher than or equal to 1800° C. between the degreasing step and the impregnation step.

Even when the porous honeycomb body provided for the impregnation step has been fired in the firing step, the porous honeycomb body can be impregnated with metal silicon by the above-described mechanism.

Effect of the Invention

The present invention succeeds in improving consistency of shape precision.

MODES FOR CARRYING OUT THE INVENTION

A heat exchanger formed by a honeycomb structure will now be described as one example of a honeycomb structure that is manufactured.

Figure 1:
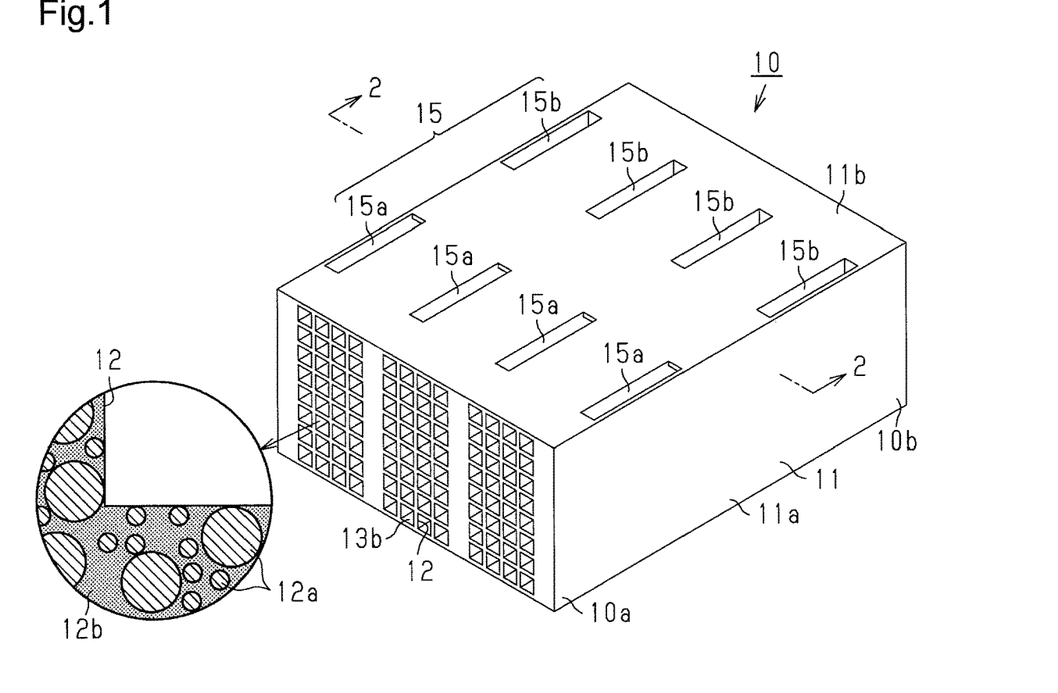
FIG. 1 is a perspective view of a heat exchanger.
Figure 2:
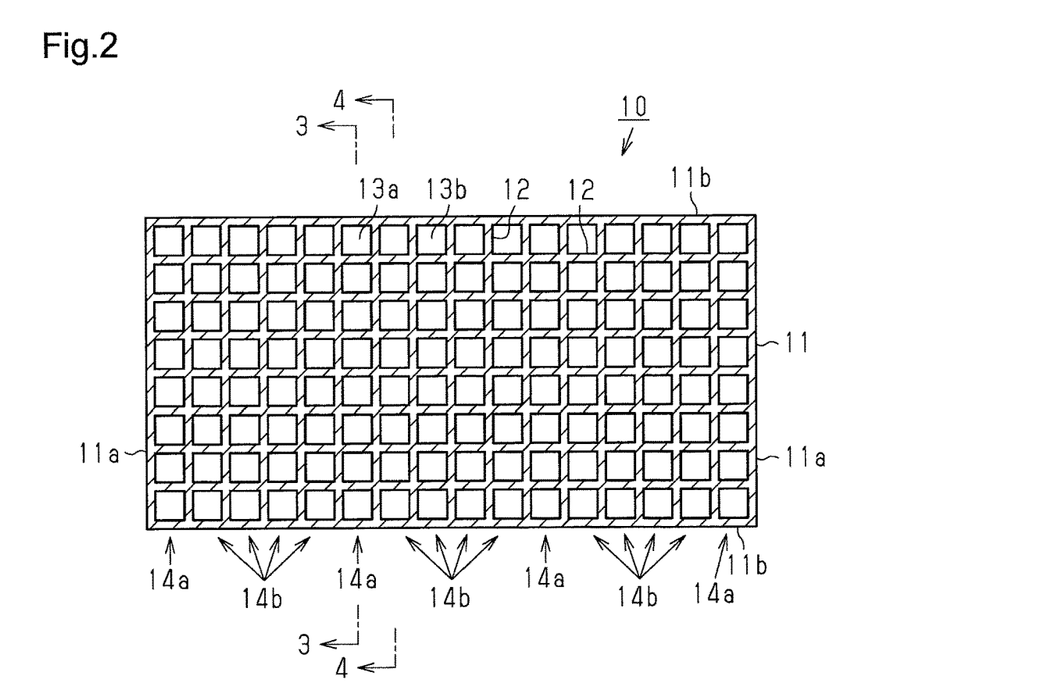
FIG. 2 is a cross-sectional view taken along line 2-2 in FIG. 1.

As shown in FIGS. 1 and 2, a heat exchanger 10 of the present embodiment includes an outer wall 11 and partition walls 12. The outer wall 11 has the form of a rectangular tube. The partition walls 12 partition the inner side of the outer wall 11 into a plurality of first cells 13a and a plurality of second cells 13b extending in an axial direction of the outer wall 11. The outer wall 11, which has the form of a rectangular tube, includes two opposing vertical side walls 11a and two opposing lateral side walls 11b. The outer wall 11 is configured so that its cross section orthogonal to the axial direction of the outer wall 11 is rectangular and laterally elongated.

As shown in FIG. 2, in a cross section orthogonal to the axial direction of the outer wall 11, the partition walls 12 form a grid-like cell structure and include partition walls 12 that are parallel to the vertical side walls 11a and partition walls 12 that are parallel to the lateral side walls 11b. The cell structure formed by the partition walls 12 is not particularly limited. For example, the cell structure may be configured so that each partition wall 12 has a thickness of 0.1 to 0.5 mm and a cell density of 15 to 93 cells per 1 $cm^2$ in a cross section orthogonal to the axial direction of the outer wall 11.

Figure 3:
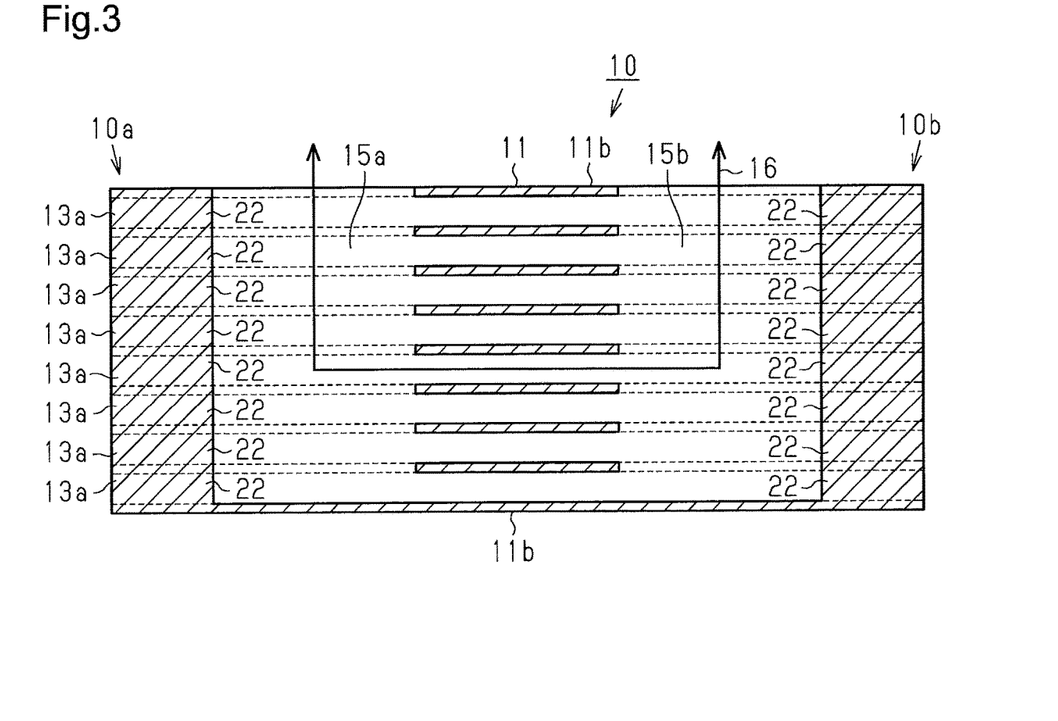
FIG. 3 is a cross-sectional view taken along line 3-3 in FIG. 2.
Figure 4:
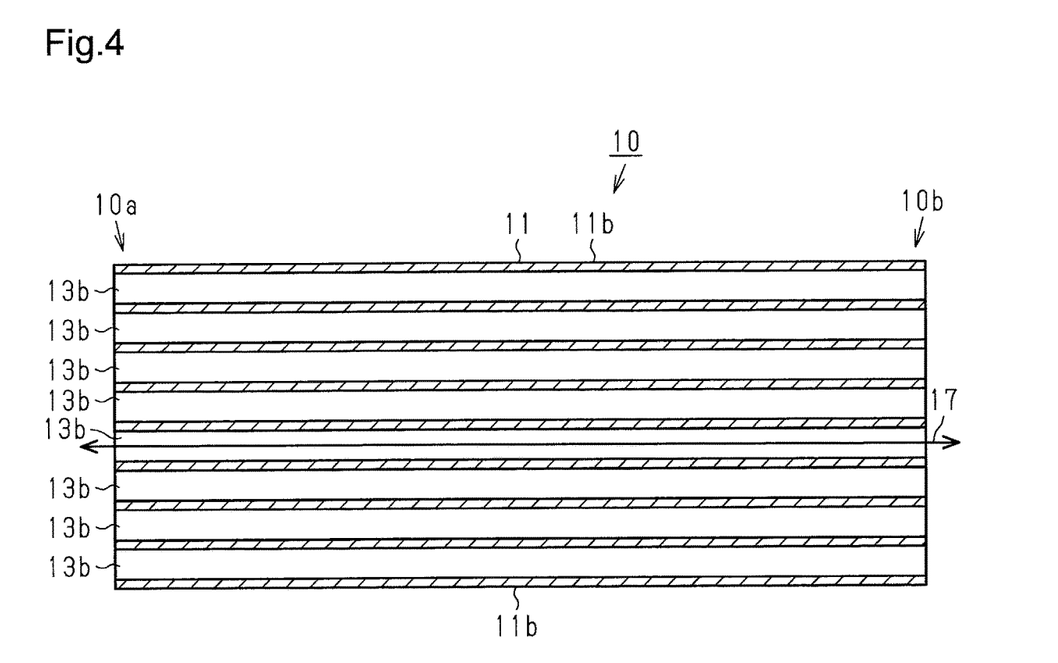
FIG. 4 is a cross-sectional view taken along line 4-4 in FIG. 2.

As shown in FIG. 3, each first cell 13a, through which a first fluid flows, include two ends that are each sealed by a sealed portion 22. As shown in FIG. 4, each second cell 13b, through which a second fluid flows, includes two open ends.

The first fluid is not particularly limited and a known heat medium may be used. Examples of the known heat medium include a coolant (long life coolant (LLC)) and an organic solvent, such as ethylene glycol. The second fluid is not particularly limited and may be, for example, exhaust gas of an internal combustion engine.

As shown in FIG. 2, in a cross section orthogonal to the axial direction of the outer wall 11, each first cell 13a has the same cross-sectional shape as each second cell 13b.

As shown in FIG. 2, the heat exchanger 10 includes a plurality of first cell lines 14a and a plurality of second cell lines 14b. Each first cell line 14a includes only the first cells 13a that are arranged parallel to the vertical side walls 11a of the outer wall 11, and each second cell lines 14b includes only the second cells 13b that are arranged parallel to the vertical side walls 11a. In the present embodiment, four second cell lines 14b are arranged between two adjacent first cell lines 14a. This arrangement is repeated to form an arrangement pattern.

As shown in FIGS. 1 and 3, the heat exchanger 10 includes a connection portion 15 extending in a vertical direction, which is parallel to the vertical side walls 11a, in each first cell line 14a. Each connection portion 15 extends through the partition walls 12 between adjacent first cells 13a in the vertical direction and connects the cells of the first cell lines 14a. Each connection portion 15 has an end at one side in the vertical direction (upper side in FIG. 3) that opens in the outer wall 11 (lateral side wall 11b) and an end at the other side in the vertical direction (lower side in FIG. 3) located at the first cell 13a that is the farthest from the opening of the connection portion 15. In other words, each connection portion 15 opens in one side of the outer wall 11 and extends to the first cell 13a that is the farthest from the opening of the connection portion 15. Each connection portion 15 of the heat exchanger 10 includes a first connection portion 15a and a second connection portion 15b. The first connection portion 15a is arranged closer to a first end 10a, which is one axial end of the heat exchanger 10, and the second connection portion 15b is arranged closer to a second end 10b, which is the other axial end of the heat exchanger 10.

As shown in FIG. 3, a first flow passage 16 is formed inside the heat exchanger 10 by the first cells 13a, the first connection portion 15a, and the second connection portion 15b. The opening of the first connection portion 15a and the opening of the second connection portion 15b in the outer wall 11 of the heat exchanger 10 function as an inlet or an outlet of the first flow passage 16. Further, as shown in FIG. 4, a second flow passage 17 is formed inside the heat exchanger 10 by each second cell 13b with the first end 10a and the second end 10b of the outer wall 11 functioning as an inlet or an outlet of the second flow passage 17. The heat exchanger 10 exchanges heat through the partition walls 12 between the first fluid flowing through the first flow passages 16 and the second fluid flowing through the second flow passages 17.

The material of the outer wall 11 and the partition walls 12 of the heat exchanger 10 will now be described. The outer wall 11 and the partition walls 12 are formed from the same material. Thus, hereinafter, the partition walls 12 will be described in detail and the outer wall 11 will not be described.

As shown in FIG. 1, the partition walls 12 include a frame portion 12a having a porous structure and a filling portion 12b. The filling portion 12b covers the surface of the frame portion 12a and is formed from metal silicon that fills the voids in the frame portion 12a. The frame portion 12a includes silicon carbide. The frame portion 12a may include a component other than silicon carbide. Examples of a component other than silicon carbide include a ceramic material, for example, a carbide, such as tantalum carbide and tungsten carbide, and a nitride, such as silicon nitride and boron nitride. When a component other than silicon carbide is included, the component may be of one type or two or more types.

Preferably, a volume ratio of the frame portion 12a to the filling portion 12b (frame portion:filling portion) in the partition walls 12 is, for example, 60:40 to 40:60. Preferably, the volume of the metal silicon forming the filling portion 12b is equal to the pore volume.

One method for manufacturing the heat exchanger 10 will now be described with reference to FIGS. 5 to 10.

The heat exchanger 10 is manufactured by sequentially performing a molding step, a processing step, a degreasing step, and an impregnation step as described below.

Molding Step

Silicon carbide particles, an organic component, and a dispersion medium are mixed to prepare a clay-like mixture as the material for molding the heat exchanger. In this case, particles other than silicon carbide particles, such as ceramic particles, may be mixed if necessary.

Preferably, the silicon carbide particles and the particles other than silicon carbide particles have an average particle size (50% particle diameter) of, for example, 0.5 to 50 µm.

Examples of the organic component include an organic binder, such as polyvinyl alcohol, methyl cellulose, ethyl cellulose, and carboxymethyl cellulose. Among these organic binders, methyl cellulose and carboxymethyl cellulose are particularly preferred. The organic binder may be of one of the above types or a combination of two or more of the above types.

Examples of the dispersion medium include water and an organic solvent. The organic solvent is, for example, ethanol. The dispersion medium may be of one of the above types or a combination of two or more of the above types.

Another component may be contained in the mixture. The other component may be, for example, a plasticizer or a lubricant. Examples of the plasticizer include a polyoxyalkylene compound, such as polyoxyethylene alkyl ether and polyoxypropylene alkyl ether. The lubricant is, for example, glycerol.

Figure 5:
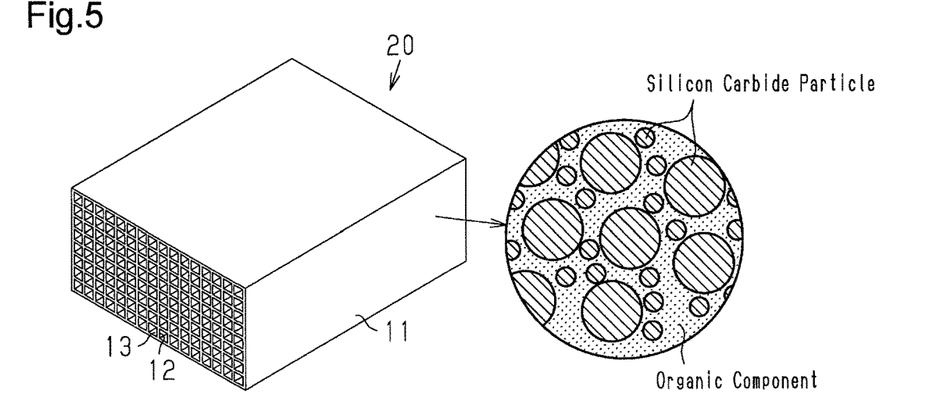
FIG. 5 is a diagram illustrating a molding step.

A molded body 20 shown in FIG. 5 is molded from the clay-like mixture. The molded body 20 includes the outer wall 11, which has the form of a rectangular tube, and the partition walls 12, which partition the inner side of the outer wall 11 into a plurality of cells 13 extending in the axial direction of the outer wall 11. The cells 13 in the molded body 20 each have two open ends. The molded body 20 can be molded, for example, through extrusion molding.

A drying process is performed on the obtained molded body 20 to dry the molded body 20 if necessary. Specifically, the drying process may be performed with, for example, a microwave dryer, a hot-air dryer, a dielectric dryer, a decompression dryer, a vacuum dryer, or a freeze dryer. The part labeled as "organic component" in the enlarged portion shown in FIG. 5 also includes a dispersion medium (not shown). When the drying process is performed, the dispersion medium included in the molded body 20 is reduced or removed.

Processing Step

In the processing step, a first process and a second process are performed. The first process is performed to form first connection portions and second connection portions in the molded body. The second process is performed to seal the two ends of some of the cells of the molded body.

Figure 6:
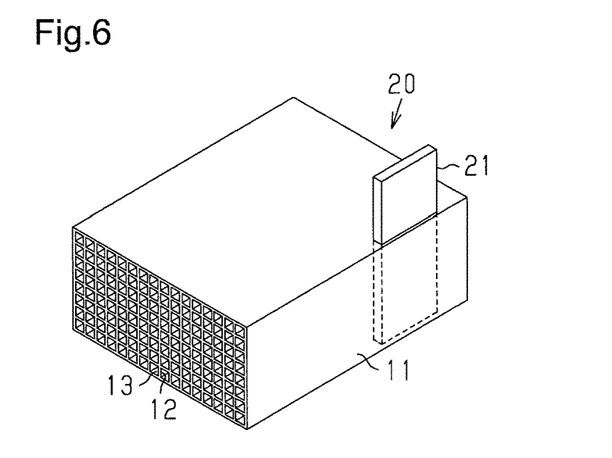
FIG. 6 is a diagram illustrating a processing step (diagram illustrating a state in which a processing jig for a first process is stuck into a molded body).

As shown in FIG. 6, in the first process, for example, a heated processing tool 21 is brought into contact with the molded body 20 to remove parts of the outer wall 11 and the partition walls 12 of the molded body 20 and form the first connection portions 15a and the second connection portions 15b.

Specifically, as shown in FIG. 6, a blade having a contour that corresponds to the first connection portion 15a and the second connection portion 15b is prepared as the processing tool 21. The blade is formed from a heat resistant metal (e.g., stainless steel) and has a thickness that is set so as not to exceed the width of the first cell 13a. Subsequently, the blade is heated to a temperature that burns and removes the organic component included in the molded body 20. For example, when the organic component is methyl cellulose, the blade is heated to 400° C. or higher.

Figure 7:
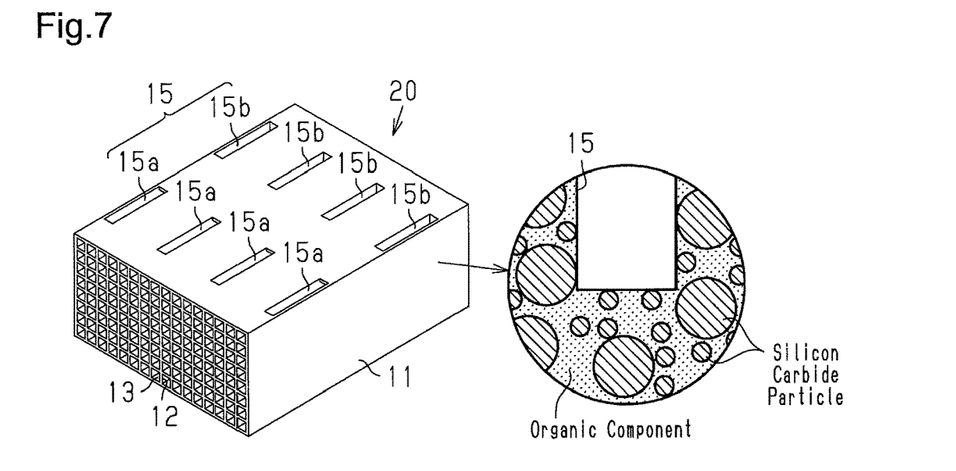
FIG. 7 is a diagram illustrating the processing step (diagram illustrating a state after the stuck processing jig is pulled out of the molded body).

As shown in FIG. 7, the heated blade is stuck into the molded body 20 from an outer side and then pulled out to form the first connection portions 15a and the second connection portions 15b. In this case, when the heated blade contacts the molded body 20, the organic component included in the molded body 20 is burned and removed at the contacting portion. Thus, the insertion resistance of the molded body 20 against the blade is extremely small. This limits deformation and breakage around the stuck portion when the blade is stuck. Further, the burned and removed organic component reduces the amount of processing waste.

Figure 8:
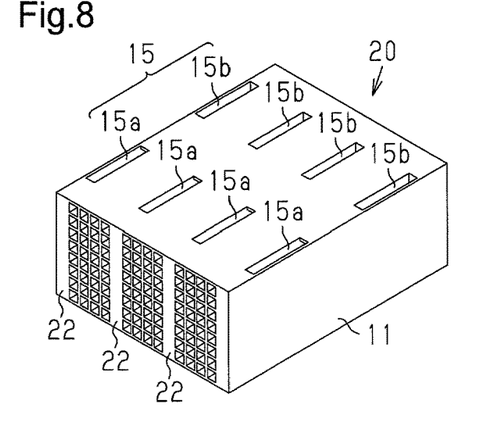
FIG. 8 is a diagram illustrating the processing step (diagram illustrating a second process).

As shown in FIG. 8, in the second process, among the cells 13 of the molded body 20, two ends of each cell 13 defining a first cell 13a are filled with the clay-like mixture used in the molding step. This forms the sealed portions 22 that seal the two ends of the cell 13. Then, a drying process is performed on the molded body 20 to dry the sealed portions 22.

A processed molded body 20a is obtained by performing the processing step including the first process and the second process. The order in which the first process and the second process are performed is not particularly limited. The first process may be performed after the second process.

Degreasing Step and Impregnation Step

Figure 9:
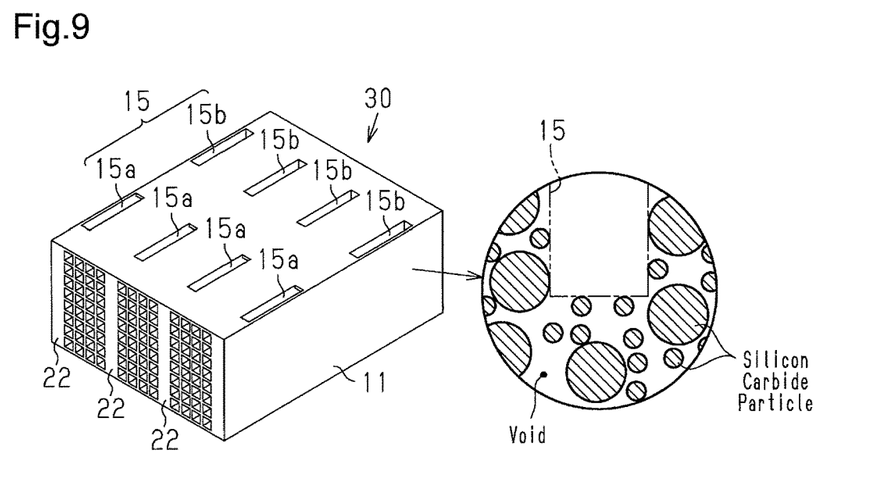
FIG. 9 is a diagram illustrating a degreasing step.

In the degreasing step, the processed molded body 20a is heated to burn the organic component included in the processed molded body 20a. This removes the organic component from the processed molded body 20a and obtains a degreased body. As shown in FIG. 9, a degreased body 30, which is obtained by removing the organic component from the processed molded body 20a in the degreasing step, has a porous structure including voids between particles of silicon carbide. Preferably, a volume of the voids (pore volume) in the degreased body 30 is 40% to 60% by volume. The pore volume of the degreased body 30 can be adjusted by varying a content rate of the silicon carbide particles in the mixture used in the molding step. In the present embodiment, the degreased body 30 having a porous structure corresponds to a porous honeycomb body.

Figure 10:
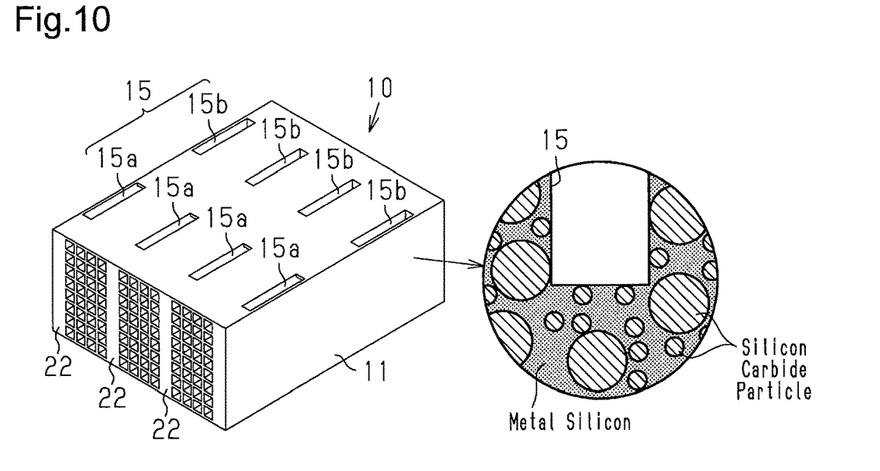
FIG. 10 is a diagram illustrating an impregnation step.

In the impregnation step, the inner side of each wall of the degreased body is impregnated with metal silicon. As shown in FIG. 10, the impregnation step is performed so that the voids between the silicon carbide particles forming each wall of the degreased body 30 are filled with metal silicon. In this manner, the heat exchanger 10 is obtained.

In the manufacturing method of the present embodiment, the degreasing step and the impregnation step are continuously performed in a heating process having multiple stages in different temperature ranges.

Figure 11:
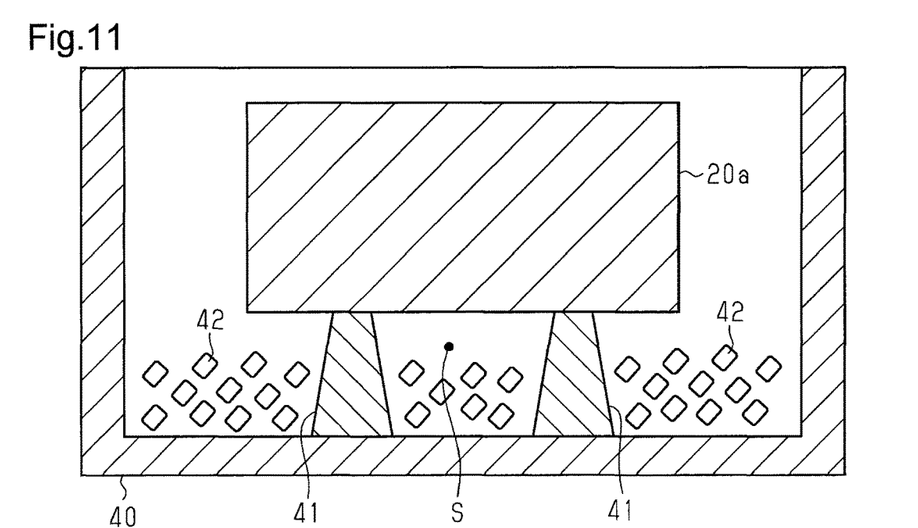
FIG. 11 is a diagram illustrating a state in which a processed molded body is placed in a container.

As shown in FIG. 11, the processed molded body 20a is placed in a heat-resistant container 40 that has the form of a box including a closed bottom and is formed from, for example, graphite. FIG. 11 does not show the cross-sectional shape of the processed molded body 20a. The processed molded body 20a is placed on supports 41, which are located on a bottom surface of the container 40. Thus, the processed molded body 20a is arranged on the supports 41 in the container 40.

Each support 41 is sized and shaped to contact only part of a lower surface of the processed molded body 20a. The supports 41 support the processed molded body 20a at one position or a few positions on the lower surface of the processed molded body 20a. There may be one or more supports 41.

The support 41 may have the form of, for example, a polygonal post, a cylinder, a truncated pyramid, or a truncated cone. In particular, the forms of a truncated pyramid and a truncated cone are preferred since the points of contact on the lower surface of the processed molded body 20a may be reduced.

The supports 41 are formed from a porous material including connected pores that are large enough to cause capillarity. The porous material forming the supports 41 is, for example, a porous material of silicon carbide or a porous material of a carbon, such as graphite. The porous material forming the supports 41 has a porosity of, for example, 20% to 60%.

Metal silicon 42 is disposed on the bottom surface of the container 40. The metal silicon 42 is in a solid state, such as powder, grain, or mass. Specifically, the metal silicon 42 is located in a space S between the bottom surface of the container 40 and the processed molded body 20a, which is placed on the supports 41. Preferably, the metal silicon 42 has a purity of less than 98%. The melting point of solid metal silicon has a tendency to become lower as the purity decreases. Thus, the use of metal silicon having a low purity can lower the heating temperature required for the impregnation step. As a result, the cost of manufacture can be decreased. The purity of metal silicon is, for example, 95% or greater.

The amount of the metal silicon 42 in the container 40, for example, corresponds to the sum of the pore volume of the supports 41 and the pore volume of the degreased body 30, which is obtained from the processed molded body 20a (for example, amount corresponding to volume of 1.00 to 1.05 times the sum). In this case, the porosity of the heat exchanger 10 becomes closer to 0%. This also decreases the amount of the metal silicon 42 used and reduces the manufacturing cost.

As described above, in a state in which the processed molded body 20a and the metal silicon 42 are placed in the container 40, the container 40 is heated in a vacuum or an inert atmosphere of, for example, argon or nitrogen using a known heating means such as a firing furnace. In this case, heating is performed on the container 40 in multiple stages in different temperature ranges.

Figure 12:
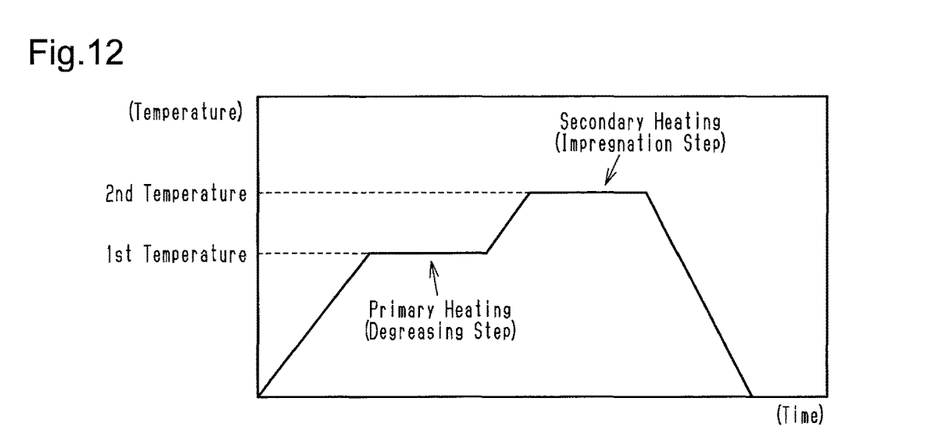
FIG. 12 is a graph showing temperature changes inside the container.

Specifically, as shown in FIG. 12, the temperature inside the container 40 is increased to a first temperature, and primary heating is performed while maintaining the temperature at the first temperature for a certain period of time. Next, the temperature inside the container 40 is increased to a second temperature that is higher than the first temperature, and secondary heating is performed while maintaining the temperature at the second temperature for a certain period of time. Then, the temperature inside the container 40 is decreased.

The primary heating is a heating process corresponding to the degreasing step. The first temperature of the primary heating is a temperature at which the organic component is burned and removed and is lower than the melting point of the metal silicon. The first temperature is set in accordance with the type of organic component included in the processed molded body 20a. The primary heating burns and removes the organic component included in the processed molded body 20a so that the processed molded body 20a becomes the degreased body (porous honeycomb body) 30 having a porous structure. The temperature (first temperature) inside the container 40 is lower than the melting point of the metal silicon so that the metal silicon 42 in the container 40 remains in a solid state.

Preferably, the first temperature is, for example, 400° C. or higher and 1400° C. or lower. Further preferably, the first temperature is 450° C. or higher and 1000° C. or lower. When the first temperature is set in the above temperature range, it is ensured that the organic component is burned and removed without melting the metal silicon 42.

Preferably, the primary heating is performed until the organic component in the processed molded body 20a is completely removed. For example, a preliminary test is conducted in advance to measure a heating time required for the processed molded body 20a to become the degreased body 30, in which organic components included in the processed molded body 20a have been removed. The temperature inside the container 40 is increased from the first temperature to the second temperature after the heating time elapses.

The secondary heating is a heating process corresponding to the impregnation step. The second temperature of the secondary heating is set to be higher than or equal to the melting point of the metal silicon. The secondary heating melts the metal silicon 42 in the container 40. Then, the molten metal silicon enters the voids between silicon carbide particles forming each wall of the degreased body (porous honeycomb body) 30 through the supports 41, which are formed from a porous material, as a result of capillary action so that the voids are impregnated with the metal silicon 42.

Preferably, the second temperature is, for example, 1420° C. or higher. When the second temperature is set in the above temperature range, impregnation with the metal silicon is further ensured.

Further, it is preferred that the second temperature be, for example, lower than or equal to 2000° C., and more preferably, lower than or equal to 1900° C. When the second temperature is set in the above temperature range, the manufacturing cost can be reduced from the aspect of, for example, equipment and energy.

It is preferred that the second temperature be lower than a sintering temperature (for example, 2000° C. or lower) of silicon carbide contained in the mixture used in the molding step. When the second temperature is set in the above temperature range, the obtained heat exchanger 10 becomes a non-sintered honeycomb structure in which most of silicon carbide particles are not sintered and exist independently from each other. The non-sintered honeycomb structure has a high Young's modulus, resists deformation, and is useful as a heat exchanger.

Preferably, the secondary heating is performed until the voids between silicon carbide particles forming each wall of the degreased body 30 are sufficiently impregnated with the metal silicon. For example, when the amount of the metal silicon 42 in the container 40 corresponds to the sum of the pore volume of the degreased body (porous honeycomb body) 30 and the pore volume of the supports 41, it can be determined that metal silicon has sufficiently impregnated the degreased body 30 when all of the metal silicon 42 impregnates the degreased body 30.

After the secondary heating, the temperature inside the container 40 is decreased. The heat exchanger 10 is taken out of the container 40, and the supports 41, which have been integrated with the lower surface of the heat exchanger 10, are separated from the lower surface. The heat exchanger 10 is obtained in this manner.

The operation and advantages of the present embodiment will now be described.

(1) The method for manufacturing the honeycomb structure, such as a heat exchanger, includes the molding step, the degreasing step, and the impregnation step. In the molding step, the molded body is molded from the mixture containing silicon carbide particles, the organic component, and the dispersion medium. In the degreasing step, the organic component included in the molded body is removed to obtain the porous honeycomb body. In the impregnation step, the inner side of the partition walls of the porous honeycomb body is impregnated with metal silicon. In a state in which the porous honeycomb body is placed on the supports inside the container containing solid metal silicon, the impregnation step is performed by heating the inside of the container to the temperature higher than or equal to the melting point of the metal silicon so that the porous honeycomb body is impregnated with molten metal silicon through the supports that are porous.

With the above configuration, the porous honeycomb body is impregnated with metal silicon by the drawing force produced by capillary action of the porous honeycomb body. This avoids a situation in which the amount of the metal silicon that impregnates the porous honeycomb body exceeds the pore volume of the porous honeycomb body, and the excess metal silicon oozes down from the periphery of the honeycomb structure or enters the cells of the honeycomb structure and narrows the cells from their intended size. As a result, the honeycomb structure has more consistent shapes.

Further, the above configuration can be applied to a molded body of various types of shapes. When the impregnation step is performed in a state in which solid metal silicon is placed on the molded body, the molded body needs to have an upper surface with a shape that would allow for the arrangement of the solid metal silicon. In this respect, with the above configuration, the impregnation step can be performed even if the upper surface of the molded body has a shape (for example, curved or angled) that would hinder the arrangement of solid metal silicon.

(2) The metal silicon is placed on the bottom surface of the container.

With the above configuration, molten metal silicon is drawn from the lower part of the container toward the upper part of the container by capillary action of the porous honeycomb body. This also avoids a situation in which excess metal silicon oozes down from the periphery of the porous honeycomb body or enters the cells of the honeycomb structure and narrows the cells from their intended size.

(3) The molded body is placed on the supports inside the container containing solid metal silicon. The degreasing step is performed by setting the temperature inside the container to the first temperature that is a temperature at which the organic component is burned and removed and is lower than the melting point of the metal silicon. Then, the impregnation step is performed by increasing the temperature to the second temperature that is higher than or equal to the melting point of the metal silicon so that the porous honeycomb body is impregnated with molten metal silicon.

With the above configuration, when the temperature inside the container is set to the first temperature, the organic component included in the molded body is burned and removed to obtain the porous honeycomb body. In this case, the first temperature is lower than the melting point of the metal silicon and thus the metal silicon in the container remains in a solid state. Then, when the temperature inside the container is increased to the second temperature that is higher than or equal to the melting point of the metal silicon, the metal silicon melts. The molten metal silicon impregnates the inner side of the porous honeycomb body through the supports so that the honeycomb structure is obtained. In this manner, the degreasing step and the impregnation step can be performed continuously in a single heating process by managing the temperature inside the container. This simplifies the manufacturing process of the honeycomb structure.

(4) The first temperature is higher than or equal to 400° C. and lower than or equal to 1400° C.

With the above configuration, when performing the heating process at the first temperature, which corresponds to the degreasing step, the organic component is burned and removed in a preferred manner without melting the metal silicon and impregnating the molded body.

(5) The second temperature is higher than or equal to 1420° C. and lower than or equal to 2000° C.

With the above configuration, when performing the heating process at the second temperature, which corresponds to the impregnation step, the porous honeycomb body is impregnated with metal silicon in a preferred manner and wear caused by excess heating is avoided. Further, the non-sintered honeycomb structure is produced easily. The non-sintered honeycomb structure has a high Young's modulus, resists deformation, and is useful as, for example, a heat exchanger.

(6) The amount of metal silicon in the container corresponds to a volume of 1.00 to 1.05 times the sum of the pore volume of the porous honeycomb body and the pore volume of the supports.

The above configuration brings the porosity of each wall of the honeycomb structure closer to 0%. Further, when the amount of the metal silicon corresponds to less than or equal to 1.05 times of the sum of the pore volume of the porous honeycomb body and the pore volume of the supports, the cells of the honeycomb structure will not be blocked by the metal silicon that impregnates the honeycomb structure. Also, the manufacturing cost can be reduced.

(7) The metal silicon in the container has a purity of less than 98%.

The above configuration can lower the second temperature, which is the heating temperature required for the impregnation step. Thus, the manufacturing cost can be reduced.

The present embodiment may be modified as described below. Also, the configuration of the above embodiment and following modifications may be combined.

The shape of the honeycomb structure (e.g., outer shape and cross-sectional shape of honeycomb structure) is not limited to the description of the above embodiment and may be changed. For example, a certain side wall of the outer wall may be thicker than other side walls of the outer wall. Alternatively, the honeycomb structure does not have to include the outer wall.

The molded body placed on the supports may be oriented in any manner. Preferably, the molded body is placed on the supports so that the thickest side wall of the outer wall of the molded body is located at the bottom. This limits deformation of the molded body that would be caused by the supports.

Figure 13:
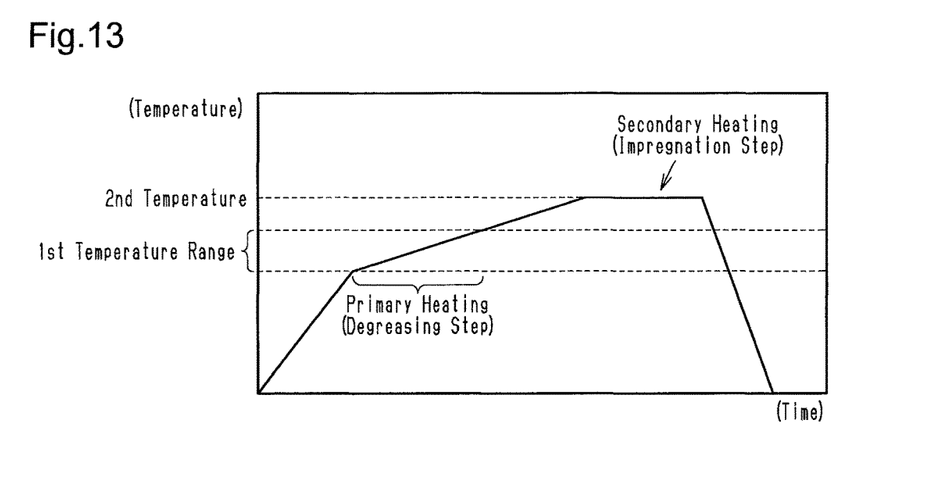
FIG. 13 is a graph showing temperature changes inside a container in a modified example.

The temperature of the primary heating corresponding to the degreasing step may be changed in a range of the first temperature. For example, as shown in FIG. 13, the temperature inside the container may continuously be increased to the second temperature, and the primary heating may be performed for the period during which the temperature remains in the range of the first temperature (first temperature range). In this case, it is preferred that the rising curve of the temperature inside the container be adjusted so that the temperature remains in the first temperature range long enough. In the same manner, the temperature of the secondary heating corresponding to the impregnation step may be changed in a range of the second temperature.

In the above embodiment, a molded body formed by a single component is placed inside the container. However, an assembly that is formed by multiple molded bodies (components) may be placed inside the container. Even with an assembly formed from multiple molded bodies, a degreased body (porous honeycomb body) having an entirely porous structure can be obtained through the primary heating corresponding to the degreasing step. Thus, the assembly is impregnated with metal silicon by the same mechanism as when the molded body formed by a single component is placed in the container. When the assembly is impregnated with metal silicon, the components are integrated with each other. In this case, integration process of the components is performed simultaneously with the impregnation step. This simplifies the manufacturing process of the honeycomb structure.

In the above embodiment, each support that is used is formed from a porous material. The support only has to have a porous shape that causes capillary action when the secondary heating (impregnation step) is performed. For example, a support may be used that is formed from the mixture used for forming the molded body or formed by a cut piece produced when molding the molded body. In this case, the support is degreased as a result of the primary heating (degreasing step) and has a porous structure in the same manner as the molded body. Alternatively, in the molding step, the molded body may be formed integrally with or assembled with a part that serves as the support. Then, the molded body or the assembly may directly be placed in the container.

In the above embodiment, the degreasing step and the impregnation step are continuously performed in a heating process having multiple stages in different temperature ranges. However, the heating process of the degreasing step may be performed separately from the heating process of the impregnation step. In this case, for example, the degreased body (porous honeycomb body) obtained through the degreasing step is placed on a support inside a container, which contains metal silicon. Then, the temperature inside the container is heated to higher than or equal to the melting point of the metal silicon to perform the impregnation step.

The porous honeycomb body provided for the impregnation step may be a fired body in which silicon carbide particles have been sintered together by firing the degreased body. For example, the degreasing step and the impregnation step are performed separately, and a firing step is performed between the degreasing step and the impregnation step to obtain the fired body by heating the degreased body at a temperature higher than or equal to 1800° C. Then, the fired body obtained through the firing step is placed on a support inside a container, which contains metal silicon, to perform the impregnation step by increasing the temperature inside the container to higher than or equal to the melting point of the metal silicon. Even if the porous honeycomb body provided for the impregnation step is a fired body, it can be impregnated with metal silicon by the same mechanism as when the porous honeycomb body is the degreased body. Further, the fired body placed inside the container may be an assembly formed by multiple fired bodies.

A step other than the molding step, the processing step, the degreasing step, and the impregnation step may also be performed. Examples of the other step include the above-described firing step, an assembly step for assembling multiple molded bodies or fire bodies to obtain an assembly, and a post-processing step for performing surface processing, such as polishing, subsequent to the impregnation step. Further, the processing step may be omitted.

Another technical concept that can be recognized from the above embodiment and the modifications is described below.

A method for manufacturing the honeycomb structure, in which the molded body is placed on the support with a thickest side wall of the outer wall of the molded body located at a lower side.

DESCRIPTION OF THE REFERENCE NUMERALS 10) heat exchanger (honeycomb structure), 11) outer wall, 12) partition wall, 12a) frame portion, 12b) filling portion, 13a) first cell, 13b) second cell, 20) molded body, 20a) processed molded body, 30) degreased body (porous honeycomb body), 40) container, 41) support, 42) metal silicon.

The invention claimed is:

1. A method for manufacturing a honeycomb structure that includes partition walls partitioning a plurality of cells, the method comprising:
   molding a molded body from a mixture containing silicon carbide particles, an organic component, and a dispersion medium;
   removing the organic component included in the molded body to obtain a porous honeycomb body; and
   impregnating an inner portion of the partition walls of the porous honeycomb body with metal silicon,
   wherein in a state in which the porous honeycomb body is placed on a support inside a container containing solid metal silicon, said impregnating is performed by heating the inside of the container to a temperature higher than or equal to a melting point of the metal silicon so that the porous honeycomb body is impregnated with molten metal silicon through the support that is porous, and
   further comprising heating the porous honeycomb body at a temperature higher than or equal to 1800° C. between said removing and said impregnating.

2. The method for manufacturing a honeycomb structure according to claim 1, wherein the metal silicon is placed on a bottom surface of the container.

3. The method for manufacturing a honeycomb structure according to claim 1, wherein
   the molded body is placed on the support inside the container, and
   said removing is performed by setting a temperature inside the container to a first temperature that is a temperature at which the organic component is burned and removed and is lower than the melting point of the metal silicon, and then said impregnating is performed by increasing the temperature to a second temperature that is higher than or equal to the melting point of the metal silicon.

4. The method for manufacturing a honeycomb structure according to claim 3, wherein the first temperature is higher than or equal to 400° C. and lower than or equal to 1400° C.

5. The method for manufacturing a honeycomb structure according to claim 3, wherein the second temperature is higher than or equal to 1420° C. and lower than or equal to 2000° C.

6. The method for manufacturing a honeycomb structure according to claim 1, wherein the porous honeycomb body placed inside the container is an assembly of a plurality of porous honeycomb bodies, from which an organic component included therein has been removed.

* * * * *